United States Patent Office 2,772,547
Patented Dec. 4, 1956

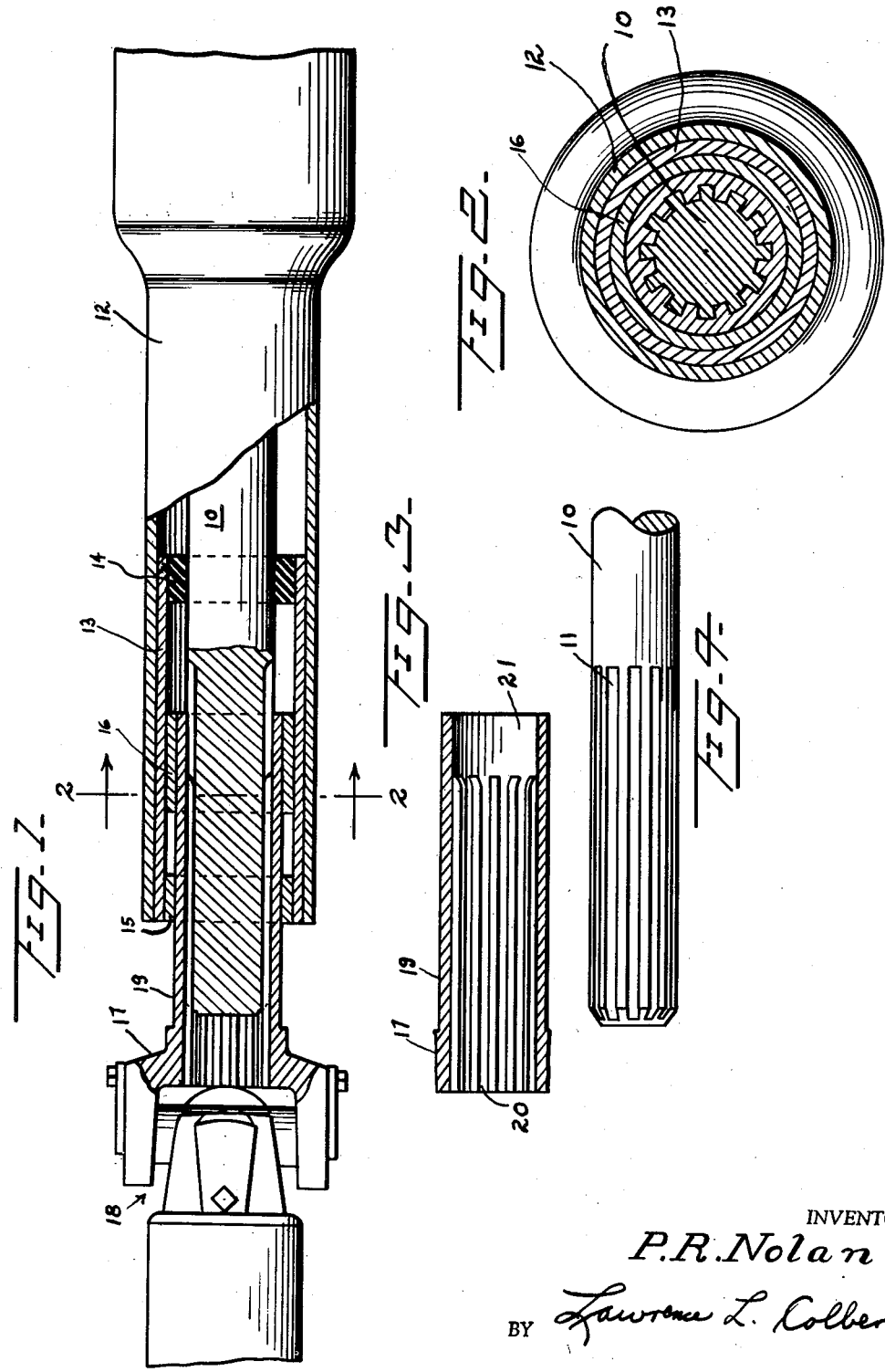

2,772,547

UNIVERSAL JOINT AND BUSHING REPLACEMENT ASSEMBLY FOR A DRIVE SHAFT ASSEMBLY

Patrick R. Nolan, Oklahoma City, Okla., assignor of one-half to M. W. Cooper, Oklahoma City, Okla.

Application June 29, 1955, Serial No. 518,800

5 Claims. (Cl. 64—1)

The present invention relates to replacement universal joint and bushing assemblies for replacing original equipment universal joints which have become worn and unserviceable.

This application is a continuation-in-part of my copending application filed September 27, 1954, Serial Number 458,476, and which is now abandoned.

The primary object of the invention is to provide a replacement universal joint and bushing assembly for drive shafts which will eliminate whip created by developed wear of the bushing in an original equipment universal joint.

Another object of the invention is to provide a structure of the class described above which can be used with conventional torque tube drive shaft combinations without altering the structure thereof.

A further object of the invention is to provide a universal joint replacement kit with substantially increased support for the joint and the drive shaft.

A still further object of the invention is to provide a replacement assembly of the class described which will relieve any binding on the joint itself or on the torque tube and will permit all of the parts of the assembly to be free from any drag or misalignment.

Another object of the invention is to provide a kit structure of the class described which will afford greater bearing surface for the internally splined portion of a universal joint member and will permit the torque tube to freely line up with the other parts of the assembly, thereby giving longer life and service.

A still further object of this invention is to provide a joint structure of the type described above which can be easily installed in place of an original equipment assembly to effect a restoration of worn or defective bearings, bushings and seals in the universal joint assembly which will be durable and dependable in use and which is inexpensive in manufacture and installation.

Further objects and advantages will become apparent in the following specification when read in light of the attached drawings, in which:

Figure 1 is a side elevation, partly in section, of the invention shown applied to a drive shaft torque tube assembly.

Figure 2 is a transverse cross-section of the device shown in Figure 1 taken on the line 2—2 of Figure 1, looking in the direction of the arrows.

Figure 3 is a fragmentary longitudinal cross-section of the tubular portion of a universal joint member.

Figure 4 is a fragmentary side elevation of the splined forward end of the conventional drive shaft to which the invention is attached.

Now referring, in detail, to the drawings wherein like reference numerals indicate like parts throughout the several figures, the reference numeral 10 indicates the conventional drive shaft of a motor vehicle which is externally splined along one end at 11. The drive shaft 10 is axially mounted in a conventional torque tube 12.

The replacement kit comprising the invention includes a sleeve 13 which is slightly longer than the splined end 11 of the drive shaft 10 and is press fitted into the forward end of the torque tube 12. The sleeve 13 has its forward end even with the forward end of the torque tube 12 while the drive shaft 10 extends forwardly a short distance beyond the forward end of the torque tube 12.

An oil and grease sealing bushing ring 14 is positioned in the rear end of the sleeve 13 and engages the drive shaft 10 to prevent the flow of oil or grease past the seal 14. A bushing 15 is mounted in the forward end of the sleeve 13 and a second bushing 16 is mounted in the sleeve 13 between the bushing 15 and the seal 14. The bushing 16 being substantially longer than either the bushing 15 or the seal 14.

The rear member 17 of a universal joint generally indicated at 18 is provided with an elongated sleeve 19 which has a length slightly greater than the length of the splined end 11 of the shaft 10. The sleeve 19 is internally splined at 20 with the splines 20 extending from the forward end thereof. The rear end of the sleeve 19 has a smooth bore as at 21 and has an internal diameter such that the bore 21 will engage over the drive shaft 10. The bore 21 of the sleeve 19 is sufficiently long to permit the sleeve 19 to be telescoped over the drive shaft 10 to the extent that the rear end of the sleeve 19 would engage the seal 14. The bushings 15 and 16 having a supporting engagement with the outer surface of the sleeve 19.

The sleeve 19 of the rear member 17 has a length such that the complete normal range of movement of the sleeve 19 with relation to the shaft 10 may be accomplished with the sleeve 19 remaining in contact with both bushings 15 and 16. The unsplined end portion 20 of the sleeve 19 serves as an aligning element as well as a bushing contacting extension.

Conventionally, the propeller shaft of an automobile is rotatably journalled at its forward end in a single bushing carried by a torque tube or propeller shaft housing. The end of the tube is externally splined and is thereby attached to the internally splined sleeve portion of a universal joint member. The forward end is not directly supported by the bushing but the bushing supports the sleeve portion of the universal joint member at the end of the torque tube. Because of relative movements of the propeller shaft and the vibrating movements of the sleeve portion of the universal joint, the bushing supporting the sleeve portions and the shaft become worn and defective and the sleeve portion itself become misaligned with the shaft and often damaged.

The primary aim and purpose of this invention is to provide a replacement sleeve portion and bushing assembly which can be easily and simply substituted for the worn and defective parts to restore the drive shaft assembly to use in a more efficient manner.

As shown in Figure 1, the propeller shaft 10 is rotatably housed in the torque tube or propeller shaft housing 12. The forward end of the shaft 10 is conventionally exteriorly axially splined and conventionally fits inside the internally splined sleeve portion of a universal joint member, which sleeve portion extends only a slight distance axially within the housing 12.

An oil and grease sealing bushing ring 14 is provided at the inner or rearward end of the sleeve 13 and is of less diameter than the bushings 15 and 16 and encompasses the propeller shaft 10. The bushings 15 and 16 are carried by the sleeve 19 in axially spaced fashion and form a unitary bushing replacement assembly. The ring 14 is adapted to engage the propeller shaft 10 beyond the splines 11 so that it engages the shaft 10 at an un-worn point spaced rearwardly from the point of original support, which latter point is usually worn. The bushings 15 and 16 engage the replacement sleeve portion 19.

In use, when the original bushing and sleeve portion becomes worn and the bushing receiving portion of the housing also becomes worn, the sleeve portion and bushing are removed. The universal joint member 17 is then provided as a replacement and the long sleeve portion 19 thereof receives the splined end 11 of the shaft 10. The sleeve 13 is press fitted tightly inside the torque tube 12 and, due to its axial length, compensates for any irregularities in the internal surface of the torque tube. The bushings 15 and 16 receive and support the sleeve portion 19. The ring 14 prevents the leakage of oil or grease past the replacement sleeve 13.

Having thus described the preferred form of the invention it should be understood that numerous structural modifications might be resorted to without departing from the scope of the appended claims.

What is claimed is:

1. In a motor vehicle of the type having a drive assembly including a torque tube and a drive shaft, having a splined forward end with the drive shaft positioned in the torque tube, a universal joint and bushing replacement assembly comprising a bushing sleeve, an oil seal mounted in the inner end of said sleeve and adapted to directly encompass a drive shaft inwardly of the splined end, a bushing mounted in the outer end of said sleeve, a second bushing mounted in said sleeve intermediate the ends thereof, and a tubular universal joint member supported in said bushings, said member having a length greater than the extent of the splines on said drive shaft and having a bore internally splined from the forward end thereof a distance less than the extent of the splines on said drive shaft with the unsplined rear portion of said bore having a diameter to permit said unsplined bore to engage over the drive shaft beyond the splined end thereof whereby said member may be longitudinally adjusted in use a substantial distance while maintaining contact with both of said bushings.

2. A device as claimed in claim 1 wherein said second bushing has a length of at least twice that of said first bushing.

3. A device as claimed in claim 1 wherein said unsplined portion of the bore of said member is shorter than said second bushing.

4. A device as claimed in claim 1 wherein said sleeve has a length greater than the length of the splines on the splined end of said drive shaft.

5. A device as claimed in claim 1 wherein said sleeve has a length greater than the length of the splines on the splined end of said drive shaft, said second bushing has a length of at least twice that of said first bushing and the unsplined portion of the bore of said member is shorter than the length of said second bushing.

No references cited.